US012646925B2

(12) United States Patent
Gentsch et al.

(10) Patent No.: US 12,646,925 B2
(45) Date of Patent: Jun. 2, 2026

(54) ARC MITIGATION SELF-POWERED TRIGGER DEVICE FOR LOW-, MEDIUM-, OR HIGH-VOLTAGE EQUIPMENT

(71) Applicant: ABB Schweiz AG, Baden (CH)

(72) Inventors: Dietmar Gentsch, Ratingen (DE);
Werner Ebbinghaus, Waltrop (DE)

(73) Assignee: ABB Schweiz AG, Baden (CH)

( * ) Notice: Subject to any disclaimer, the term of this patent is extended or adjusted under 35 U.S.C. 154(b) by 105 days.

(21) Appl. No.: 18/508,426

(22) Filed: Nov. 14, 2023

(65) Prior Publication Data

US 2024/0079866 A1     Mar. 7, 2024

Related U.S. Application Data

(63) Continuation of application No. PCT/EP2022/062470, filed on May 9, 2022.

(30) Foreign Application Priority Data

May 14, 2021   (EP) ..................................... 21173955

(51) Int. Cl.
*H02H 7/20*        (2006.01)
*H02H 1/00*        (2006.01)
*H02H 1/06*        (2006.01)

(52) U.S. Cl.
CPC ............. *H02H 7/20* (2013.01); *H02H 1/0023* (2013.01); *H02H 1/063* (2013.01)

(58) Field of Classification Search
CPC ......... H02H 7/20; H02H 1/0023; H02H 1/063
See application file for complete search history.

(56) References Cited

U.S. PATENT DOCUMENTS 8,319,173 B2 *  11/2012  Schweitzer, III .... H02H 1/0023
                                                  250/370.11
8,576,521 B2 *  11/2013  Rodgers ............... H02H 1/0023
                                                  361/42
11,165,238 B2 *  11/2021  Schweitzer, III .... H02H 1/0023
                          (Continued)

FOREIGN PATENT DOCUMENTS

DE      102013001612 A1 *  8/2013   .......... H02H 1/0023
EP         2624272 B1    11/2014
                          (Continued)

OTHER PUBLICATIONS

Littelfuse AF0100 Datasheet (Year: 2023).*
                          (Continued)

*Primary Examiner* — Crystal L Hammond
*Assistant Examiner* — Samantha L Faubert
(74) *Attorney, Agent, or Firm* — Fitch Even Tabin & Flannery LLP

(57)                ABSTRACT

An arc mitigation apparatus includes an arc mitigation device and a solar cell. The arc mitigation device is configured to be mounted to a low-, medium-, or high-voltage switchgear. The arc mitigation device is configured to stop or limit current flow within at least one part of the low-, medium-, or high-switchgear when activated. The solar-cell is configured to be located within a compartment of the low-, medium-, or high-voltage switchgear. The solar-cell is configured to cause the arc mitigation device to activate due to radiation from an electrical arc of the switchgear impinging upon the solar-cell.

18 Claims, 2 Drawing Sheets

(56) References Cited

U.S. PATENT DOCUMENTS

| | | | |
|---|---|---|---|
| 11,451,018 B2 * | 9/2022 | Kim | .................... H01H 31/003 |
| 11,527,878 B2 * | 12/2022 | Zhou | ........................ H01H 9/38 |
| 2010/0328824 A1 | 12/2010 | Roscoe | |
| 2012/0044600 A1 | 2/2012 | Roscoe et al. | |

FOREIGN PATENT DOCUMENTS

| | | | | |
|---|---|---|---|---|
| EP | 3771053 A1 * | 1/2021 | .............. | H02H 7/22 |
| KR | 101303840 B1 * | 9/2013 | ......... | G01R 31/1218 |
| WO | WO-2019242977 A1 * | 12/2019 | .............. | H01B 3/56 |

OTHER PUBLICATIONS

EP3771053A1 (Year: 2021).*

KR101303840B1 (Year: 2013).*

European Patent Office, International Search Report in International Patent Application No. PCT/EP2022/062470, 4 pp. (Sep. 28, 2022).

European Patent Office, Written Opinion in International Patent Application No. PCT/EP2022/062470, 6 pp. (Sep. 28, 2022).

European Patent Office, Extended European Search Report in European Patent Application No. 21173955.2, 7 pp. (Nov. 10, 2021).

* cited by examiner

ARC MITIGATION SELF-POWERED TRIGGER DEVICE FOR LOW-, MEDIUM-, OR HIGH-VOLTAGE EQUIPMENT

CROSS-REFERENCE TO RELATED APPLICATIONS

The instant application claims priority to International Patent Application No. PCT/EP2022/062470, filed May 9, 2022, and to European Patent Application No. 21173955.2, filed May 14, 2021, each of which is incorporated herein in its entirety by reference.

FIELD OF THE DISCLOSURE

The present disclosure relates to an arc mitigation trigger apparatus for a low-, medium-, or high-voltage equipment.

BACKGROUND OF THE INVENTION

To limit the destruction effect of an arc fault inside a switchgear or other equipment, it is desirable to limit the arc destruction duration by establishing a fast and stable current path from the conductor on potential to ground potential or between the phases if available, that the arc fault current is commutated to an arc mitigation device and the arc fault is distinguished. Currently, all active arc mitigation devices are trigger and powered from separate electronics and the required energy is provided from a capacitor or another energy storage. In addition, the device requires an auxiliary power supply. To get the information to trigger the arc mitigation device there must be an optical sensor (for example an optical eye or glass fibre) and in addition information regarding the fault current status is required, requiring for example a current transformer, sensor or reed contact(s).

EP2624272B1 relates to a switchgear with a switching device, driven by propellant chemical charge or fast acting switch, with means for current or fault current detection and optical sensor means for arc fault light or arc fault light detection.

This does not always lead to the most effective and required arc mitigation.

BRIEF SUMMARY OF THE INVENTION

The present disclosure describes an improved technique for providing energy for arc mitigation in low-, medium- and high-voltage switchgears.

In an aspect, there is provided an arc mitigation apparatus for a low-, medium-, or high-voltage switchgear, the arc mitigation apparatus comprising:

an arc mitigation device; and a solar-cell;

The arc mitigation device is configured to be mounted to a low-, medium-, or high voltage switchgear. The arc mitigation device when activated is configured to stop or limit current flow within at least one part of the low-, medium-, or high-voltage switchgear. The solar-cell is configured to be located within a compartment of the low-, medium-, or high-voltage switchgear. The solar-cell is configured to cause the arc mitigation device to activate due to radiation from an electrical arc fault of the switchgear impinging upon the solar-cell.

BRIEF DESCRIPTION OF THE SEVERAL VIEWS OF THE DRAWING(S)

DETAILED DESCRIPTION OF THE INVENTION

Figure 1:
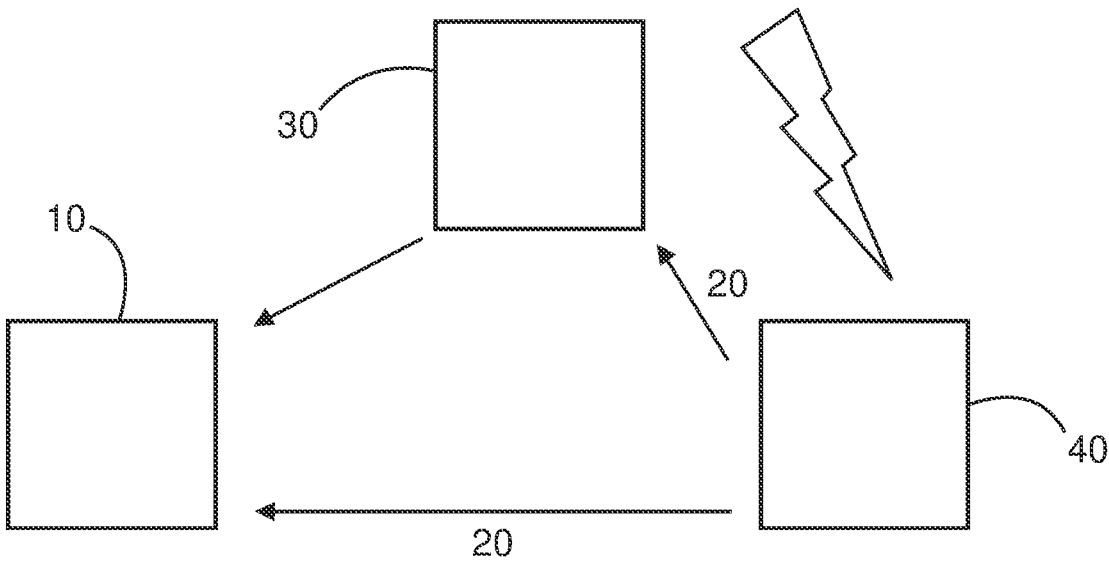
FIG. 1 is a block diagram of an exemplary embodiment of an arc mitigation apparatus for a low-, medium-, or high-voltage switchgear in accordance with the disclosure.

FIGS. 1, 2, 3a, and 3b relate to an arc mitigation apparatus for a low-, medium-, or high-voltage switchgear. In an example, the mitigation apparatus, for a low-, medium-, or high-voltage switchgear, comprises an arc mitigation device 10, and a solar-cell 40. The arc mitigation device is configured to be mounted to a low-, medium-, or high-voltage switchgear. The arc mitigation device when activated (triggered) is configured to stop or limit current flow within at least one part of the low-, medium-, or high-voltage switchgear. The solar-cell is configured to be located within a compartment of the low-, medium-, or high-voltage switchgear, or circuit. The solar-cell is configured to cause the arc mitigation device to activate due to radiation from an electrical arc fault of the switchgear impinging upon the solar-cell.

In an example, the solar-cell is configured generate a current 20 over a threshold current level to activate the arc mitigation device due to the radiation from the electrical arc fault of the switchgear impinging upon the solar-cell.

In an example, the solar-cell is configured such that radiation impinging upon the solar-cell below a threshold intensity level is not sufficient to cause the arc mitigation device to activate.

In an example, the solar-cell is configured to directly activate the arc mitigation device due to the radiation from the electrical arc fault of the switchgear impinging upon the solar-cell.

In an example, the solar-cell is configured generate a current 20 over a threshold current level to directly activate the arc mitigation device due to the radiation from the electrical arc fault of the switchgear impinging upon the solar-cell.

In an example, the arc mitigation apparatus comprises a merging unit. The merging unit is located within or associated with the arc mitigation device. The merging unit is configured such that when activated the merging unit is configured to activate the arc mitigation device. The solar-cell is configured to activate the merging unit due to the radiation from the electrical arc fault of the switchgear impinging upon the solar-cell.

In an example, the merging unit comprises a stored energy unit (will be charged from solar cell in case of a fault) and activation of the merging unit is configured to release energy from the stored energy unit to activate the arc mitigation device. Here a simple analog electronic circuit can be applied.

In an example, the stored energy unit activate a micro gas generator or a pressurized gas container or one/more springs.

In an example, the arc mitigation device when activated is configured to make a connection between the life part of the switchgear phases or to the circuit ground potential.

In an example, the arc mitigation device is an Ultra-Fast-Earthing-Switch "UFES" or another fast-acting device.

In an example, a signal from the solar-cell due to the radiation from the electrical arc fault of the switchgear impinging upon the solar-cell is configured within the merging unit to trip optionally an upstream circuit breaker of the low-, medium- or high-voltage switchgear.

In an example, the arc mitigation apparatus comprises an arc fault indication device within the merging unit.

In an example, the arc fault indication device is a single use arc fault indication device, the arc fault indication device comprises a magnetic powder.

Continuing with the figures, the arc mitigation apparatus for a low-, medium-, or high-voltage switchgear is further described with respect to specific embodiments.

The inventors realized they could develop an arc mitigation apparatus that only uses a solar-cell to obtain the light and the fault arc current information to make a reliable trip by the production of enough energy from the solar-cell, only in the situation when such fault mitigation is required, in order to activate any arc mitigation device.

It was realized that in the case of an arc fault, the light produced that can be considered to be "Light and "Current" information" can be utilized to trigger an arc mitigation device without any monitoring of arc fault current. It was realized that in the case of an arc fault the light emission is strong enough that the solar cell will produce enough energy (around 5 times more than provide by typically given strong sunshine impinging) which exceeds a given threshold value to initiate activation of the arc mitigation device. At the same time, standard light, ambient light or flashlight cannot produce, via the solar cell, enough energy to trip the mitigation device. The sunshine light converted energy from the solar cell will be leaded directly to earth to avoid energy loading in storage.

Thus, currently the detection of an internal arc fault inside a switchgear/circuit is done by means of an optical arc flash sensor, which triggers an external power supplied electronic device with a charged capacitor to actuate the active primary arc mitigation device, and this is linked with determination of a current threshold value.

However, now with the new apparatus developed by the inventors, there is no need to detect both the current and the light together because the arc fault itself is used to generate enough power to trigger the active arc mitigation device. The new technique using a solar-cell triggers and powers the mitigation device within less than 4-5 ms in the situation of arc fault currents above typical values of 2 kA.

The new technique provides for extremely short operation time of the primary arc mitigation devices within less than 2-3 ms in the case of fault arc currents above 2 kA current, in conjunction with the rapid and reliable detection of the fault, leads to the arc fault being extinguished almost immediately after it arises.

A solar-cell such as a monocrystalline-Si unit (or other solar-cell) can be selected, based on fast and durable analogue technology, to provide for a reliable, robust, and fast function.

Thus, the new technique provides for threshold tripping only in the case of an arc fault. All other light sources (sunlight, lamps or flash) do not provide enough energy to the solar cell to provide enough power to trip the arc mitigation device. With this selective technique an unwanted operation of the arc mitigation device will be avoided.

The solar cell monitors the switchgear (the circuit) on a continuous and autonomous basis without being influenced by these external light sources. Along with the arc mitigation device, this approach ensures continuous, complete equipment and personnel protection all the time, even during maintenance operations.

Since the standard switchgears are designed as internal arc-proof solutions, in line with the standard, the new manner of providing arc elimination by means of arc mitigation devices and a solar cell, that can provide a highest possible level of protection to persons, to the circuit and to the equipment in case of an internal arc event in switchgears or electrical circuits, is recognized by the Standard IEC 62271-200.

The following provides details on an operational sequence of the new technique utilizing self-powered solar cell, that in the situation case of an internal arc fault event provides a trigger element for arc mitigation devices in an intrinsically robust and simple manner.

The primary arc fault energy is converted to the actuation energy by the solar-cell, and therefore this does not need any auxiliary supply.

The solar cell when exposed to light produced due to an arc fault current the energy output is about factor 5 higher than the current that the solar cell can produce with maximum ambient light.

The arc mitigation device can be for example an Ultra-Fast-Earthing-Switch (UFES) for low-, medium-voltage application, and the arc fault can be eliminated in less than 5 ms in the situation when the arc current will be above 2 kA. In the situation when arc currents are lower than this, an operation time of less than 50 ms is achievable and arc fault mitigation can be done within that time period.

It is to be noted that normally currents below 2 kA are handled by present protection systems in switchgear.

A trip signal can, if necessary, be sent to the upstream breaker to interrupt the fault current.

The long-term operational reliability of state-of-the art solar-cells are well known. In switchgear application these solar cell will be installed inside switchgear compartments or in or outdoor circuits which are protected from the environmental impacts. That leads to an expected lifetime of more than 35 years.

The selectivity between the arc mitigation devices in a "complex" switchgear configuration with respect to the solar cell in different compartments is possible.

EMC/EMI related complications are very much reduced, because of the higher operational energy requirement of the arc mitigation device.

The arc detection by means of solar cell is able to activate the mitigation device within less than 3 ms at the time the arc fault current is present, and the UFES (arc mitigation device) operates within <2 milliseconds. Therefore, the arc fault is eliminated within less than 5 ms (arc-fault current >2 kA).

As detailed above, the new arc mitigation apparatus for a low voltage, medium voltage, or high voltage switchgear detects and eliminates the arc fault in low- and medium- and high-voltage switchgear. The technique is simple and flexible and can be adapted to different switchgear configurations and ensures personnel safety and faster repair of the switchgear in the case of an internal arc fault.

The new apparatus can be part of newly built switchgear but can also be retrofitted to already installed switchgears arrangements.

It is also to be noted that reference to switchgear is mentioned, but the new apparatus can be utilized for example in converters (DC-grid) as well.

FIG. 1 shows an example of an arc mitigation apparatus for a low voltage, medium voltage, or high voltage switchgear. An arc fault produces light that falls on the solar-cell 40 and the current flow 20 produced from the solar-cell via the merging unit 30 or directly from the solar-cell 40 to the arc mitigation device 10 triggers the arc mitigation device to operate.

The following relates to specific features.

Figure 2:
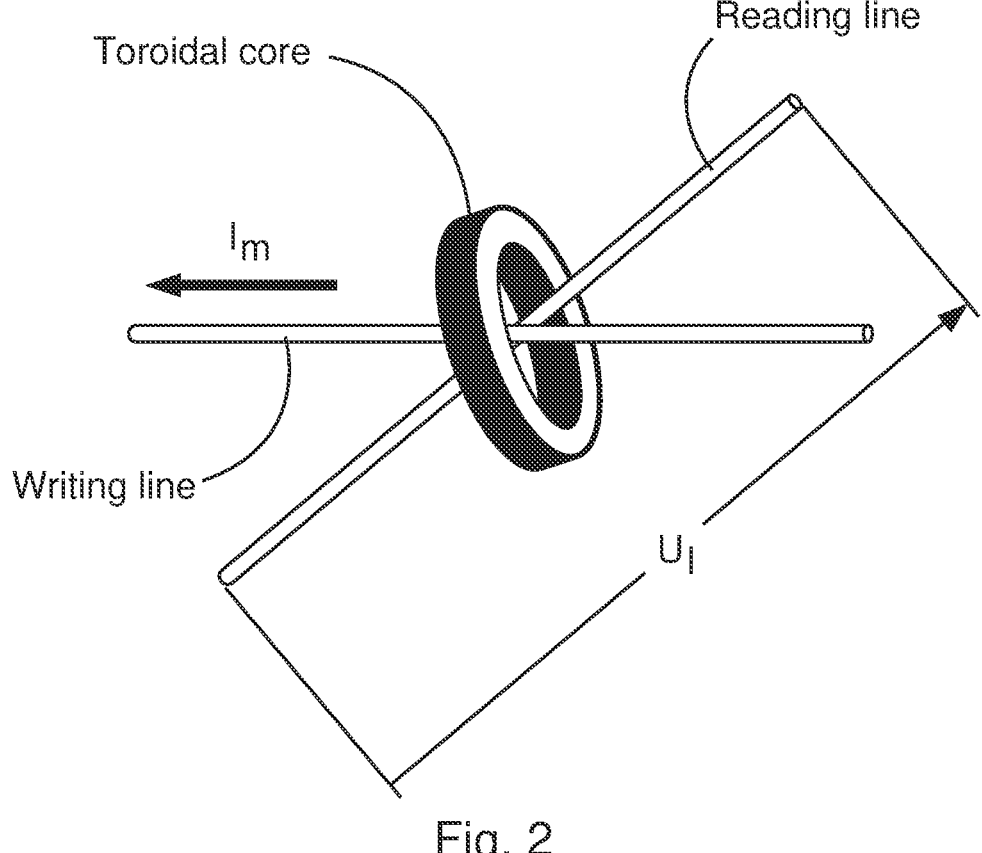
FIG. 2 is a block diagram of an exemplary embodiment of a magnetic core memory in accordance with the disclosure.

Fault location signaling: It is also to be noted that UFES status monitoring and diagnosis function can be utilized to find the fault location. This can be implemented by using magnetic-core memory technology, as shown in FIG. 2, where Im and UI are current are potential respectively.

This technology offers the following features: Magnetic core memory to store the information arc fault location; Storing the fault location by using of a single magnetic core to latch the "ON" state with the fault current information; Reading of the core status with and external device by resetting to "OFF" state.

Figure 3B:
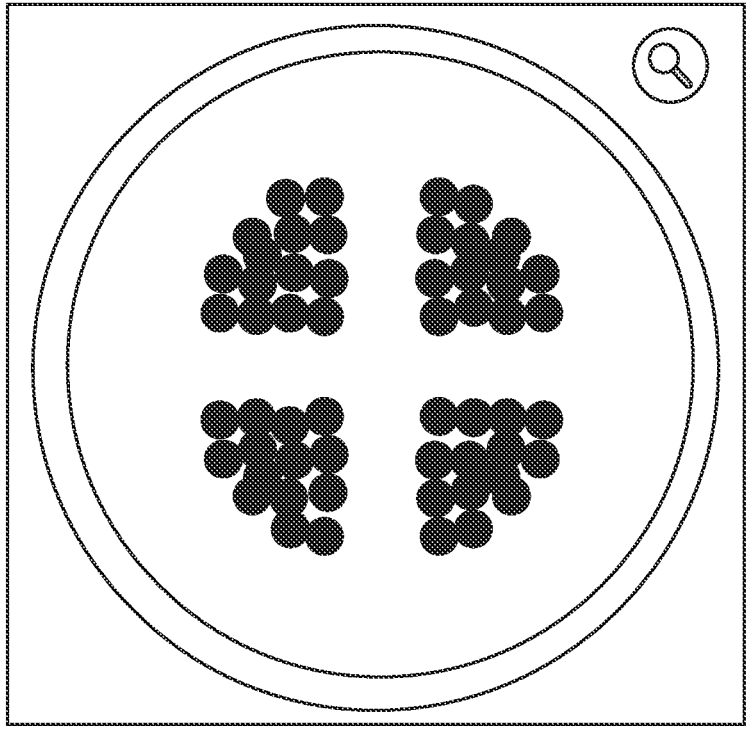
FIGS. 3a and 3b show an example of a single use arc fault location indication device with magnetic powder, shown before (FIG. 3a) and after detection (FIG. 3b) of an arc fault.
Figure 3A:
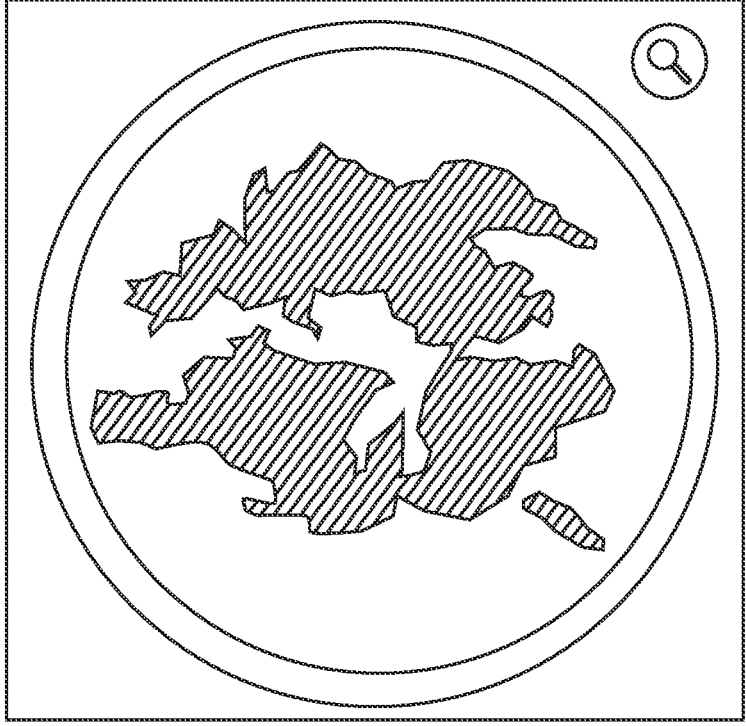

Fault location indication based on magnetic field: Solar-cell cable generated based on coil winding magnetic field and supported by steel core, to trigger the magnetic powder. This can be a single use device (security label) to indicate the arc fault location. The magnetic powder detects by optical indication the arc fault with a magnetic field of about 50 mT and it is immediately visible, as shown in FIG. 3b.

The information can be even provided from a fast-acting bistable relay. This part can be placed on the outside as well as on the inside at the switchgear.

Tripping power management, and Solar panel loop supervision. The supervision of solar panel circuit can be done via a pilot impulse. Can be powered if needed by a long-life "lithium" battery that enables with the entire system to operate independently from the auxiliary voltage.

PSE trip circuit supervision: The supervision of the activation circuit is checked by a pilot impulse. It can be powered if needed by a long-life "lithium" battery that enables with the entire system to operate independently from the auxiliary voltage.

Activation power supervision: In the case of an arc fault the availability of minimum needed activation energy can be monitored. The current from the solar cell will feed the capacitor storing the activation energy. In case the threshold value is reached, the energy of the capacitor is used to operate the mitigation device. The occurrence of ambient light or flash will not lead to an operation of the mitigation device because the charging current is filtered with a characteristic that even long-duration lightning cannot operate the mitigation device.

In an example, the solar-cell is configured generate a current over a threshold current level to cause the arc mitigation device to activate due to the radiation from the electrical arc of the switchgear impinging upon the solar-cell.

In an example, the solar-cell is configured such that radiation impinging upon the solar-cell below a threshold intensity level is not sufficient to cause the arc mitigation device to activate.

In an example, the solar-cell is configured to directly activate the arc mitigation device due to the radiation from the electrical arc of the switchgear impinging upon the solar-cell.

In an example, the solar-cell is configured to generate a current over a threshold current level to directly activate the arc mitigation device due to the radiation from the electrical arc fault of the switchgear impinging upon the solar-cell.

In an example, the arc mitigation apparatus comprises a merging unit. The merging unit is located within or associated with the arc mitigation device. The merging unit is configured such that when activated the merging unit is configured to activate the arc mitigation device. The solar-cell is configured to activate the merging unit due to the radiation from the electrical arc fault of the switchgear impinging upon the solar-cell.

In an example, the merging unit comprises a stored energy unit (will be charged from solar cell in case of a fault) and wherein activation of the merging unit is configured to release energy from the stored energy unit (threshold value) to activate the arc mitigation device.

In an example, the stored energy unit supplies the trigger (activation) energy to the micro gas generator or a pressurized gas container or one or more springs.

In an example, the arc mitigation device when activated (triggered) is configured to make a connection between the life parts (busbar on potential) and/or to ground potential.

In an example, the arc mitigation device is an Ultra-Fast-Earthing-Switch "UFES" or another fast-acting device.

In an example, the radiation from the electrical arc fault of the switchgear impinging upon the solar-cell is configured within the merging unit to trip a circuit breaker of the low-, medium- or high-voltage switchgear.

In an example, the arc mitigation apparatus comprises a magnetic core memory configured to store arc fault location information initiated by the provided solar-cell current to be used the remanence of the iron core.

In an example, the arc mitigation apparatus comprises an arc fault indication device within the merging unit.

In an example, the arc fault indication device is a single use arc fault indication device, the arc fault indication device comprises a magnetic powder.

The above aspect and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An arc mitigation apparatus for a low voltage, medium voltage, or high voltage switchgear, the arc mitigation apparatus comprising:
    an arc mitigation device;
    a solar cell; and
    a magnetic core memory configured to store arc fault location information,
    wherein the arc mitigation device is configured to be mounted to a low voltage, medium voltage, or high voltage switchgear;
    wherein the arc mitigation device when activated is configured to stop or limit current flow within at least one part of the low voltage, medium voltage, or high voltage switchgear;
    wherein the solar cell is configured to be located within a compartment of the low voltage, medium voltage, or high voltage switchgear;
    wherein the solar cell is configured to cause the arc mitigation device to activate due to radiation from an electrical arc fault of the switchgear impinging upon the solar cell; and
    wherein storing the arc fault location information comprises using a single magnetic core to latch an ON state with fault current information.

2. The arc mitigation apparatus according to claim 1, wherein the solar cell is configured generate a current over a threshold current level to activate/trigger/operate the arc mitigation device to activate due to the radiation from the electrical arc fault of the switchgear impinging upon the solar cell.

3. The arc mitigation apparatus according to claim 1, wherein the solar cell is configured such that the radiation impinging upon the solar cell below a threshold intensity level is not sufficient to cause the arc mitigation device to activate.

4. The arc mitigation apparatus according to claim 1, wherein the solar cell is configured to directly activate the arc mitigation device due to the radiation from the electrical arc fault of the switchgear impinging upon the solar cell.

5. The arc mitigation apparatus according to claim 4, wherein the solar cell is configured generate a current over a threshold current level to directly activate the arc mitigation device due to the radiation from the electrical arc fault of the switchgear impinging upon the solar cell.

6. The arc mitigation apparatus according to claim 1, wherein the arc mitigation apparatus further comprises a merging unit, and wherein the merging unit is located within or associated or in line with the arc mitigation device.

7. The arc mitigation apparatus according to claim 6, wherein the merging unit is configured such that when activated the merging unit is configured to activate the arc mitigation device, and wherein the solar cell is configured to activate the merging unit due to the radiation from the electrical arc fault of the switchgear impinging upon the solar cell.

8. The arc mitigation apparatus according to claim 6, wherein the merging unit comprises a stored energy from the solar cell into the merging unit and wherein activation of the merging unit is configured to release energy to activate the arc mitigation device.

9. The arc mitigation apparatus according to claim 1, wherein the arc mitigation device when activated is configured to make a connection between a part of the switchgear and the ground potential.

10. The arc mitigation apparatus according to claim 1, wherein the arc mitigation device when activated is configured to make a connection between two phases of the switchgear.

11. The arc mitigation apparatus according to claim 1, wherein the arc mitigation device is an Ultra-Fast-Earthing-Switch "UFES".

12. The arc mitigation apparatus according to claim 1, wherein a signal from the solar cell due to the radiation from the electrical arc fault of the switchgear impinging upon the solar cell is configured to trip a circuit breaker of the low voltage, medium voltage or high voltage switchgear.

13. The arc mitigation apparatus according to claim 1, wherein the arc mitigation apparatus further comprises an arc fault indication device comprising a bistable relay.

14. The arc mitigation apparatus according to claim 13, wherein the arc fault indication device is a single use arc fault indication device.

15. The arc mitigation apparatus according to claim 6, wherein the merging unit is configured to provide merging of solar cell cables on a compartment level to one cable per each switchgear to the merging unit.

16. The arc mitigation apparatus according to claim 6, wherein the merging unit is configured to provide energy, driven from an installed battery for a self-supervision function of an entire trigger cable conductivity circuit.

17. An arc mitigation apparatus for a low voltage, medium voltage, or high voltage switchgear, the arc mitigation apparatus comprising:
    an arc mitigation device;
    a merging unit; and
    a solar cell,
    wherein the arc mitigation device is configured to be mounted to a low voltage, medium voltage, or high voltage switchgear,
    wherein the arc mitigation device when activated is configured to stop or limit current flow within at least one part of the low voltage, medium voltage, or high voltage switchgear,
    wherein the solar cell is configured to be located within a compartment of the low voltage, medium voltage, or high voltage switchgear,
    wherein the solar cell is configured to cause the arc mitigation device to activate due to radiation from an electrical arc fault of the switchgear impinging upon the solar cell,
    wherein the merging unit is located within or associated or in line with the arc mitigation device,
    wherein the merging unit comprises a stored energy from the solar cell into the merging unit,
    wherein activation of the merging unit is configured to release energy to activate the arc mitigation device, and wherein the stored energy unit comprises a micro gas generator or a pressurized gas container or one or more springs.

18. An arc mitigation apparatus for a low voltage, medium voltage, or high voltage switchgear, the arc mitigation apparatus comprising:

an arc mitigation device; and a solar cell, wherein the arc mitigation device is configured to be mounted to a low voltage, medium voltage, or high voltage switchgear, wherein the arc mitigation device when activated is configured to stop or limit current flow within at least one part of the low voltage, medium voltage, or high voltage switchgear, wherein the solar cell is configured to be located within a compartment of the low voltage, medium voltage, or high voltage switchgear, wherein the solar cell is configured to cause the arc mitigation device to activate due to radiation from an electrical arc fault of the switchgear impinging upon the solar cell, wherein the arc mitigation apparatus further comprises an arc fault indication device comprising a bistable relay, and wherein the arc fault indication device comprises a magnetic powder.

* * * * *